Oct. 30, 1962  B. E. A. LAWSON  3,061,251
SOCKET MOUNT
Original Filed March 12, 1953
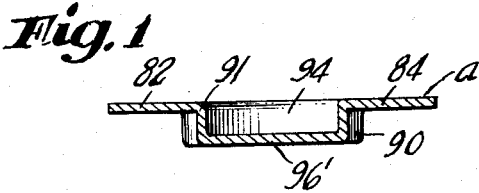
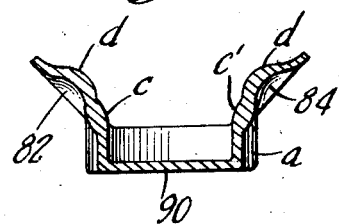
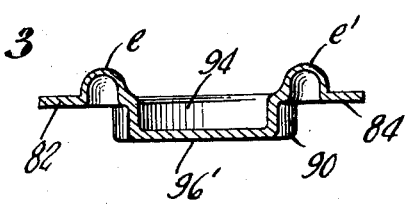
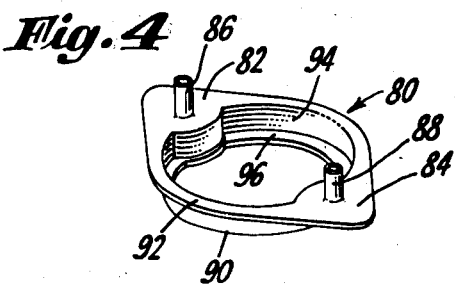
INVENTOR
BERT E. A. LAWSON
BY Amster + Levy
ATTORNEYS

United States Patent Office 3,061,251
Patented Oct. 30, 1962

3,061,251
SOCKET MOUNT
Bert E. A. Lawson, Lakewood, N.Y., assignor, by mesne assignments, to Sylvania Electric Products, Inc., Wilmington, Del., a corporation of Delaware
Original application Mar. 12, 1953, Ser. No. 341,851, now Patent No. 2,918,721, dated Dec. 29, 1959. Divided and this application Apr. 9, 1959, Ser. No. 807,972
3 Claims. (Cl. 248—27)

The present invention relates to mounts or saddles for tube sockets, and in particular to an improved socket saddle constructed by progressively working flat metallic stock.

This is a division of application Serial No. 341,851, filed March 12, 1953, and entitled "Process for Fabricating a Socket Mount," which is now U.S. Patent No. 2,918,721.

In supporting vacuum tubes on a chassis, it has become increasingly popular to employ a mount or saddle which seats the tube socket body and is secured to the chassis. Usually, the saddle is attached to the chassis by separate eyelets or studs requiring an operator to handle several components. This is time consuming and, when mounting miniature vacuum tubes, especially, requires a fair amount of skill and dexterity.

To overcome these and other difficulties, it is advantageous to construct a socket mount or saddle having a seat to secure the socket body, and formed with a flange or ears having integral eyelets to simplify handling of the mounts and assembly on the chassis. The tube socket may be received within the seat and the saddle is mounted on the chassis by inserting the eyelets of the saddle in apertures provided in the chassis and thereafter upsetting the ends of the eyelets. In order to assure adequate support for the tube, the seat in the mount should be relatively deep and the eyelets should be dimensioned to allow for a rigid connection to the chassis. In addition to these physical requirements, the manufacture of the socket saddle should be accomplished at low unit cost, especially in view of the extensive use of the saddles.

An object of the present invention is to provide socket saddles with integral eyelets without adversely affecting the mechanical strength of the saddles.

Another object is to provide a saddle having relatively deep socket-receiving seats and well dimensioned attaching studs or eyelets.

In accordance with article aspects of the present invention, the socket mount of ductile sheet material comprises an embossed socket-seating part and ears integral with the socket-seating part having eyelets. The socket-seating part and ears meet each other along regions thickened by material crowded inwardly from the free extremities of the ears.

The nature of the invention will be best understood by reference to the following illustrative drawings, wherein:

FIG. 1 is a longitudinal sectional view of a socket mount during processing.

FIG. 2 is an enlarged longitudinal sectional view of a socket mount after the swaging process.

FIG. 3 is a longitudinal sectional view of the socket mount after the swaging, shaping processes.

FIG. 4 is a perspective view of a completed socket mount.

The socket mount 80 of FIG. 4 includes a pair of opposed ears or supporting parts 82, 84 formed with integral upwardly projecting cylindrical eyelets or attaching studs 86, 88. Extending in the opposite direction from the eyelets 86, 88 is a socket-seating part 90 which includes an upper marginal flange 92 formed as a continuation of the coplanar ears 82, 84, a depending, substantially cylindrical, bounding wall 94, and a lower, inwardly projecting, supporting flange 96.

The flat metallic stock $a$ is shaped to include the depending socket seating part 90 having a cylindrical bounding wall 94 and a solid bottom wall 96. As clearly seen in FIG. 1. The socket seating part 90 merges into the opposed ears 82, 84 along a sharply turned shoulder 91. The metal of the coplanar ears 82, 84 is crowded toward the socket seating part 90. This crowding or flowing of the metal of the ears reinforces regions $c$, $c'$, which are subsequently stressed during the formation of the integral eyelets 86, 88. The ears 82, 84 are deformed into divergent relationship and form dome-shaped protuberances $d$, $d'$ thereon having the reinforced parts $c$, $c'$ meeting the socket seating part 90 along the shoulder 91. The socket seating part 90 is further embossed to obtain greater definition and a deeper seat. The dome-shaped protuberances are "necked down" or formed into substantially cylindrical extensions $e$, $e'$ having closed upper ends, as seen in FIG. 3. The cross section of the extensions $e$, $e'$ is reduced into the desired elongated cylindrical configuration of the integrally formed eyelets 86, 88. In lieu of the continuous supporting flange 96, are produced radial legs or the like extending inwardly from the circular bounding wall 94.

While in accordance with the provisions of the statutes, there has been illustrated and described the best form of embodiment of our invention now known, it will be apparent to those skilled in the art that changes may be made in the form of the apparatus disclosed and in the method without departing from the spirit of our invention as set forth in the appended claims and that in some cases certain features of our invention may be used to advantage without a corresponding use of other features.

What I claim is:

1. A socket mount fabricated of a ductile metal sheet stock comprising an embossed socket-seating part including a marginal flange and a cylindrical bounding wall projecting in one direction from said marginal flange and integral therewith, opposed ears integral with said socket-seating part and in coplanar relation with said marginal flange, said ears merging into said socket-seating part at sharp bends and including regions contiguous to said bends which are initially reinforced by the crowding of metal of said ears toward said bends, and eyelets integral with each of said ears and drawn substantially from the reinforced regions of said ears, the final thickness of said bends in said regions being substantially equal to the original thickness of said sheet stock.

2. A socket mount fabricated of a ductile metal sheet stock comprising an embossed socket-seating part including a marginal flange, a cylindrical bounding wall projecting in one direction from said marginal flange and integral therewith, and a supporting flange integral with said bounding wall and projecting inwardly therefrom, opposed ears integral with said socket-seating part and in coplanar relation with said marginal flange, said ears merging into said socket-seating part at sharp bends and including regions contiguous to said bends which are initially reinforced by the crowding of metal of said ears toward said bends, and eyelets integral with each of said ears and drawn substantially from the reinforced regions of said ears, the final thickness of said bends in said regions being substantially equal to the original thickness of said sheet stock.

3. A socket mount fabricated of ductile metal sheet stock comprising an embossed socket-seating part including a marginal flange, a cylindrical bounding wall projecting in one direction from said marginal flange and integral therewith, and a supporting flange integral with said bounding wall and projecting inwardly therefrom, opposed ears integral with said socket-seating part and in coplanar relation with said marginal flange, said ears merging into said socket-seating part at sharp bends and including regions contiguous to said bends which are initially reinforced by the crowding of metal of said ears toward said bends, and eyelets integral with each of said ears and drawn substantially from the reinforced regions of said ears, said eyelets projecting from said marginal flange in the opposite direction from said cylindrical bounding wall, the final thickness of said bends in said regions being substantially equal to the original thickness of said sheet stock.

References Cited in the file of this patent
UNITED STATES PATENTS

| | | |
|---|---|---|
| 2,100,042 | Travis | Nov. 23, 1937 |
| 2,382,970 | Borcherdt | Aug. 21, 1945 |
| 2,610,500 | Poupitch | Sept. 16, 1952 |
| 2,773,115 | Despard | Dec. 4, 1956 |
| 2,846,701 | Bedford | Aug. 12, 1958 |